(12) United States Patent
Yamamoto et al.

(10) Patent No.: US 12,057,714 B2
(45) Date of Patent: Aug. 6, 2024

(54) ON-VEHICLE DEVICE AND ON-VEHICLE SYSTEM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Yasuyuki Yamamoto, Yokkaichi (JP); Kosuke Sone, Yokkaichi (JP); Hiroki Hirai, Yokkaichi (JP); Ichiro Kuwayama, Osaka (JP); Suguru Yamagishi, Osaka (JP); Toyohisa Takano, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 35 days.

(21) Appl. No.: 18/006,037

(22) PCT Filed: Jul. 8, 2021

(86) PCT No.: PCT/JP2021/025772
§ 371 (c)(1),
(2) Date: Jan. 19, 2023

(87) PCT Pub. No.: WO2022/019135
PCT Pub. Date: Jan. 27, 2022

(65) Prior Publication Data
US 2023/0352980 A1     Nov. 2, 2023

(30) Foreign Application Priority Data
Jul. 20, 2020 (JP) ................ 2020-123669

(51) Int. Cl.
*H02J 50/20* (2016.01)
*B60N 2/00* (2006.01)

(52) U.S. Cl.
CPC ............ *H02J 50/20* (2016.02); *B60N 2/0022* (2023.08); *B60N 2/0035* (2023.08)

(58) Field of Classification Search
CPC ......... H02J 50/20; B60N 2/00; B60N 2/0022; B60N 2/0035
See application file for complete search history.

(56) References Cited

U.S. PATENT DOCUMENTS

2011/0210619 A1  9/2011 Beart et al.
2014/0252813 A1  9/2014 Lee et al.
(Continued)

FOREIGN PATENT DOCUMENTS

JP     2002-173099 A     6/2002

OTHER PUBLICATIONS

International Search Report, Application No. PCT/JP2021/025772, mailed Aug. 31, 2021. ISA/Japan Patent Office.

*Primary Examiner* — Robert L Deberadinis
(74) *Attorney, Agent, or Firm* — Honigman LLP

(57) ABSTRACT

An on-vehicle device that is to be mounted in a vehicle includes: an electrical component including a sensor; a power supply module including a power receiving antenna and a power supply circuit configured to convert radio waves for power feeding received by the power receiving antenna into electric power and supply the electric power to the electrical component; and a line member having flexibility and electrically connecting the electrical component to the power supply module.

12 Claims, 3 Drawing Sheets

(56) References Cited

U.S. PATENT DOCUMENTS

2019/0157916 A1    5/2019   Takemoto et al.
2020/0108768 A1    4/2020   Ali et al.

ON-VEHICLE DEVICE AND ON-VEHICLE SYSTEM

CROSS-REFERENCE TO RELATED APPLICATIONS

This application is the U.S. national stage of PCT/JP2021/025772 filed on Jul. 8, 2021, which claims priority of Japanese Patent Application No. JP 2020-123669 filed on Jul. 20, 2020, the contents of which are incorporated herein.

TECHNICAL FIELD

The present disclosure relates to an on-vehicle device and an on-vehicle system.

BACKGROUND

JP 2019-97303A discloses a wireless power transmission system that has a wireless power transmission device and at least one wireless power receiving device for installation in a vehicle.

In JP 2019-97303A, electric power can be supplied by being wirelessly received by various members in the vehicle. However, J P 2019-97303A does not disclose any relationship between the members in the vehicle and the wireless power receiving device in terms of the arrangement. Here, it is desirable that the flexibility of arrangement of the members can be improved in the vehicle.

The present disclosure has been made to solve the foregoing problem and aims to provide an on-vehicle device and an on-vehicle system that can improve the flexibility of arrangement of various members in a vehicle.

SUMMARY

An on-vehicle device according to the present disclosure is an on-vehicle device that is to be mounted in a vehicle, including: an electrical component including a sensor; a power supply module including a power receiving antenna and a power supply circuit configured to convert radio waves for power feeding received by the power receiving antenna into electric power and supply the electric power to the electrical component; and a line member having flexibility and electrically connecting the electrical component to the power supply module.

An on-vehicle system to be mounted in a vehicle according to the present disclosure includes: an on-vehicle device; and a power feeding antenna to be provided in a ceiling of the vehicle and configured to transmit radio waves for power feeding from the ceiling to an interior space of the vehicle, the on-vehicle device including: an electrical component having a sensor; a power supply module having a power receiving antenna and a power supply circuit configured to convert the radio waves for power feeding received by the power receiving antenna into electric power and supply the electric power to the electrical component; and a line member having flexibility and electrically connecting the electrical component to the power supply module.

One aspect of the present disclosure can be realized as a semiconductor integrated circuit that realizes a part or the entirety of the on-vehicle device or the on-vehicle system.

Effects of the Present Disclosure

According to the present disclosure, the flexibility of arrangement of various members can be improved in the vehicle.

DETAILED DESCRIPTION OF PREFERRED EMBODIMENTS

Figure 1:
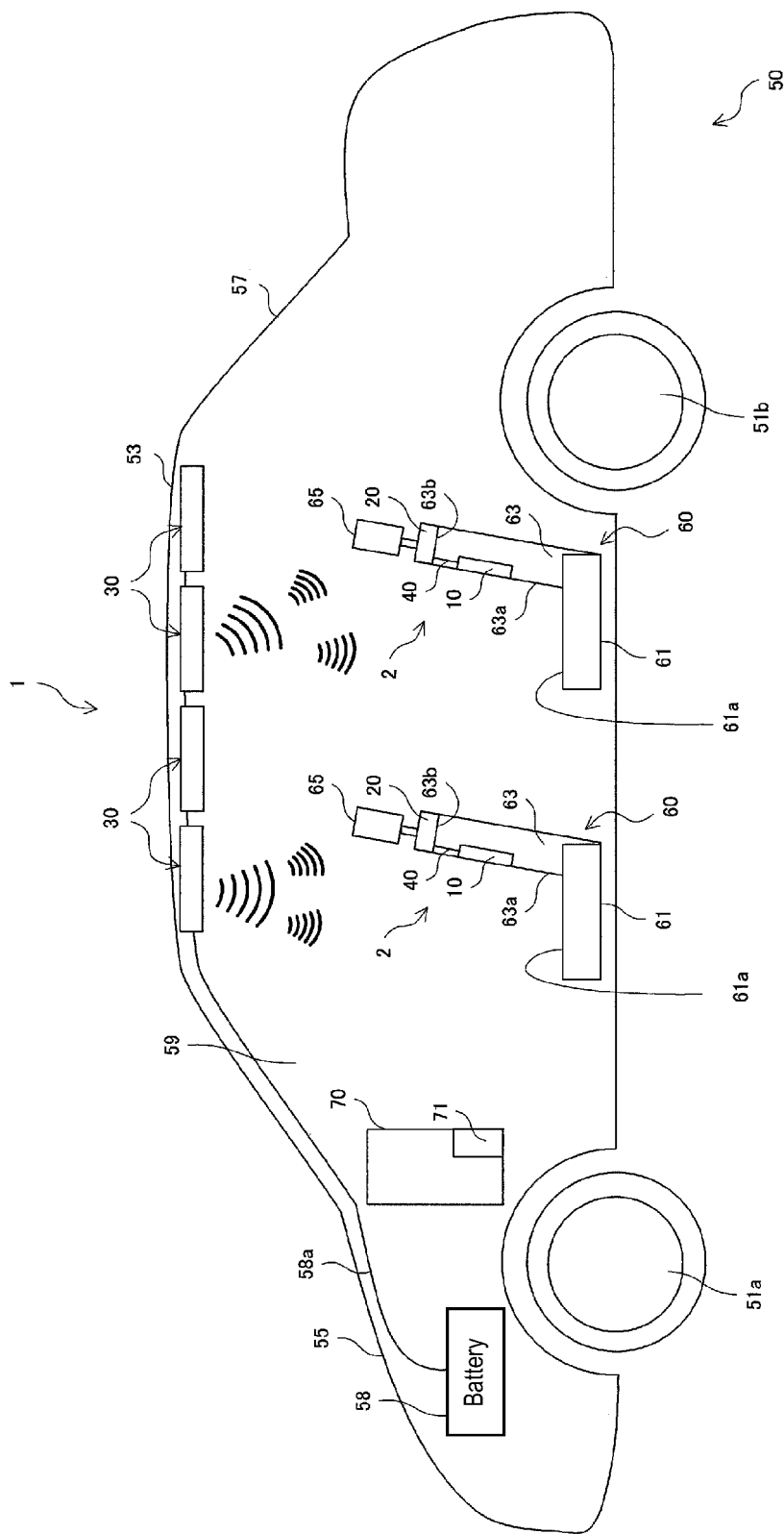
FIG. 1 is a side view showing a configuration of a vehicle equipped with an on-vehicle system that includes an on-vehicle device according to the embodiment of the present disclosure.

First, the details of an embodiment of the present disclosure are listed and described.

An on-vehicle device according to the embodiment of the present disclosure is an on-vehicle device that is to be mounted in a vehicle, including: an electrical component including a sensor; a power supply module including a power receiving antenna and a power supply circuit configured to convert radio waves for power feeding received by the power receiving antenna into electric power and supply the electric power to the electrical component; and a line member having flexibility and electrically connecting the electrical component to the power supply module.

For example, the vehicle can be equipped with an electrical component, such as a sensor for detecting odor in the vehicle, the sensor for detecting the heartbeat and the body temperature of a user in the vehicle, a car navigation, and a television. Electric power is needed to drive such an electrical component. The above-described power supply module receives radio waves for power feeding with the power receiving antenna, and converts the radio waves for power feeding received by the power receiving antenna into electric power with the power supply circuit. The power supply module then outputs the electric power to the electrical component via the line member.

The electrical component and the power supply module are electrically connected via the line member but are separate bodies. This can improve the flexibility of arrangement of the electrical component in the vehicle.

In addition, the power supply module can also be arranged more flexibly at, for example, a position at which the power supply module can easily receive the radio waves for power feeding. This can improve the flexibility of arrangement of the electrical component while allowing the power receiving antenna to be arranged at a position at which the power receiving antenna can receive the radio waves for power feeding.

Furthermore, the configuration using the flexible line member can further improve the flexibility of relative arrangement of the power supply module and the electrical component.

According to the above configuration, the flexibility of arrangement of various members can be improved in the vehicle.

Preferably, the electrical component detects, using the sensor, an indicator including at least either a physical condition of a user or an atmospheric condition in the vehicle, and the sensor is to be provided in a cover of a seat mounted in the vehicle.

Providing the sensor in the cover of the seat enables detection of indicators of the physical condition of the user sitting in the seat, such as the heartbeat and the body temperature of the user. The sensor can also detect atmospheric indicators such as the temperature and humidity in the vehicle. Electrically connecting the sensor to the power supply module via the line member enables the sensor to be arranged in the cover of the seat without being limited by the position at which the power supply module is arranged.

Preferably, the line member is a flexible printed circuit (FPC).

This configuration can improve the design flexibility of the circuit that connects the power supply module to the electrical component.

Preferably, the power receiving antenna receives the radio waves for power feeding that are based on electric power supplied from the vehicle.

The power receiving antenna receives radio waves for power feeding that are based on electric power supplied from a battery or the like of the vehicle, for example. Accordingly, the supply and reception of electric power can be completed within the vehicle.

An on-vehicle system to be mounted in a vehicle according to the embodiment of the present disclosure includes: an on-vehicle device; and a power feeding antenna to be provided in a ceiling of the vehicle and configured to transmit radio waves for power feeding from the ceiling to an interior space of the vehicle, the on-vehicle device including: an electrical component having a sensor; a power supply module having a power receiving antenna and a power supply circuit configured to convert the radio waves for power feeding received by the power receiving antenna into electric power and supply the electric power to the electrical component; and a line member having flexibility and electrically connecting the electrical component to the power supply module.

For example, the vehicle can be equipped with an electrical component, such as a sensor for detecting odor in the vehicle, the sensor for detecting the heartbeat and the body temperature of a user in the vehicle, a car navigation, and a television. Electric power is needed to drive such an electrical component. The above-described power supply module receives radio waves for power feeding with the power receiving antenna, and converts the radio waves for power feeding received by the power receiving antenna into electric power with the power supply circuit. The power supply module then outputs the electric power to the electrical component via the line member.

The electrical component and the power supply module are electrically connected via the line member but are separate bodies. This can improve the flexibility of arrangement of the electrical component in the vehicle.

In addition, the power supply module can also be arranged more flexibly at, for example, a position at which the power supply module can easily receive the radio waves for power feeding. This can improve the flexibility of arrangement of the electrical component while allowing the power receiving antenna to be arranged at a position at which the power receiving antenna can receive the radio waves for power feeding.

Furthermore, the configuration using the flexible line member can further improve the flexibility of relative arrangement of the power supply module and the electrical component.

According to the above configuration, the flexibility of arrangement of various members can be improved in the vehicle.

In addition, the configuration in which the power feeding antenna is provided on the ceiling of the vehicle makes it unlikely for the radio waves for power feeding from the power feeding antenna to be blocked by fixtures, such as the seats, in the vehicle interior space. Accordingly, the power receiving antenna of the power supply module can obtain better reception quality for the radio waves for power feeding from the power feeding antenna.

Preferably, the power feeding antenna transmits, to the power receiving antenna, the radio waves for power feeding that are based on electric power supplied from the vehicle.

The power feeding antenna transmits radio waves for power feeding that are based on electric power supplied from a battery or the like of the vehicle, for example. Accordingly, the supply and receipt of electric power can be completed within the vehicle.

Hereinafter, embodiments of the present disclosure will be described with reference to the drawings. Note that, in the drawings, the same reference numerals are given to the same or corresponding components in the drawings, and redundant descriptions thereof are not repeated. Furthermore, at least parts of the embodiments described below may be suitably combined.

FIG. 1 is a side view showing a configuration of a vehicle equipped with an on-vehicle system that includes an on-vehicle device according to the embodiment of the present disclosure.

Referring to FIG. 1, a vehicle 50 is equipped with an on-vehicle system 1 that includes on-vehicle devices 2 according to the present embodiment. First, the configuration of the vehicle 50 equipped with the on-vehicle system 1 will be briefly described.

Referring to FIG. 1, the vehicle 50 includes a front part 55 and a rear part 57 with a ceiling 53 therebetween as viewed from the side. The front part 55 includes front wheels 51a, and the rear part 57 includes rear wheels 51b. A battery 58, which stores electric power necessary for driving the vehicle 50, is stored inside the front part 55.

A vehicle interior space 59 is formed between the front part 55 and the rear part 57 of the vehicle 50. An instrument panel module 70 is provided in the vicinity of the front part 55 within the vehicle interior space 59. The instrument panel module 70 is configured by units including a dashboard, an air conditioning device, a car navigation system, a television, an audio unit, or the like.

A plurality of seats 60 are arranged in the front-back direction so as to face the front side, namely the front part 55 of the vehicle 50, in the vehicle interior space 59. Each seat 60 includes a seat portion 61, a backrest portion 63, and a headrest 65. The seat portion 61 is a portion on which the user's buttocks are to be placed, and has a seat surface portion 61a that is a substantially horizontal surface facing the ceiling 53. The backrest portion 63 is a portion that supports the back of the user, and is attached to the rear part of the seat portion 61 so as to rise toward the ceiling 53. The backrest portion 63 has a backrest surface portion 63a, which is a portion with which the back of the user comes into contact, and a backrest top face portion 63b that faces the ceiling 53. The headrest 65 is a portion at which the head of the user is to be located, and is attached to the backrest portion 63 so as to protrude from the backrest top face portion 63b toward the ceiling 53.

The seat surface portion 61a, the backrest surface portion 63a, and the backrest top face portion 63b each correspond to a cover of the seat 60 of the present disclosure.

In addition, the vehicle 50 has doors (not shown) that can be opened and closed for passengers to enter and exit the vehicle 50. Further, a steering wheel, a brake, and the like are provided at positions adjacent to the instrument panel module 70 in the vehicle interior space 59.

Problem

A sensor, which is an electrical component, can be arranged in a vehicle. The sensor is driven by a supply of electric power. To supply electric power to the sensor, for example, an electrical cable is drawn from a battery of the vehicle, and electric power can be supplied from the battery to the sensor via the electrical cable. However, the electrical cable from the battery to the sensor needs to be arranged in the vehicle interior space. In this case, it is difficult to route the electrical cable to the sensor arranged at a predetermined position while avoiding structures, such as seats, in the vehicle interior space. Moreover, if the number of sensors increases, a plurality of electrical cables need to be routed in the vehicle interior space, making the arrangement of the electrical cables more difficult.

There is also a method of supplying electric power to the sensor from a device that converts radio waves for power feeding received with a power receiving antenna into electric power. However, there are cases where the position at which the sensor is arranged is limited by the position at which the power receiving antenna is arranged. It is, therefore, desirable that the flexibility of arrangement of the sensor, which is an electrical component, can be improved in the vehicle. Furthermore, it is desirable that the flexibility of arrangement of the power receiving antenna can be improved.

In this regard, the on-vehicle system according to the embodiment of the present disclosure solves the above problem by the following configuration and operation.

Referring to FIG. 1, the vehicle 50 is equipped with an on-vehicle system 1 capable of transmitting and receiving radio waves for power feeding. The on-vehicle system 1 includes on-vehicle devices 2 and power feeding modules 30.

Figure 2:
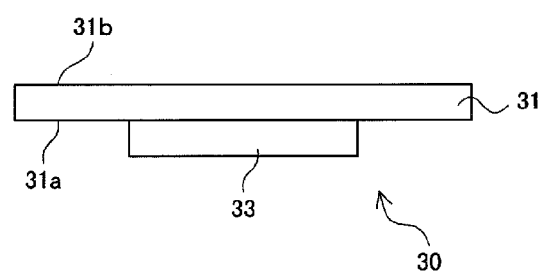
FIG. 2 is a diagram showing a configuration of the power supply module in the on-vehicle system according to the embodiment of the present disclosure.
Figure 3:
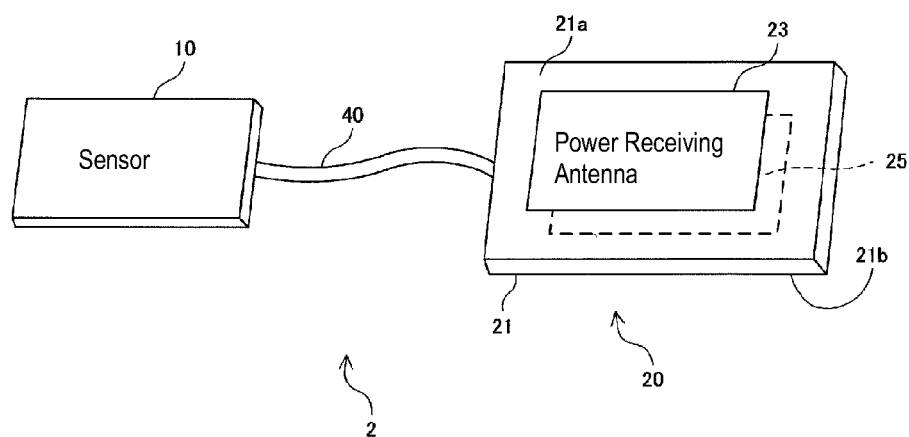
FIG. 3 is a diagram showing a configuration of the on-vehicle device according to the embodiment of the present disclosure.
Figure 4:
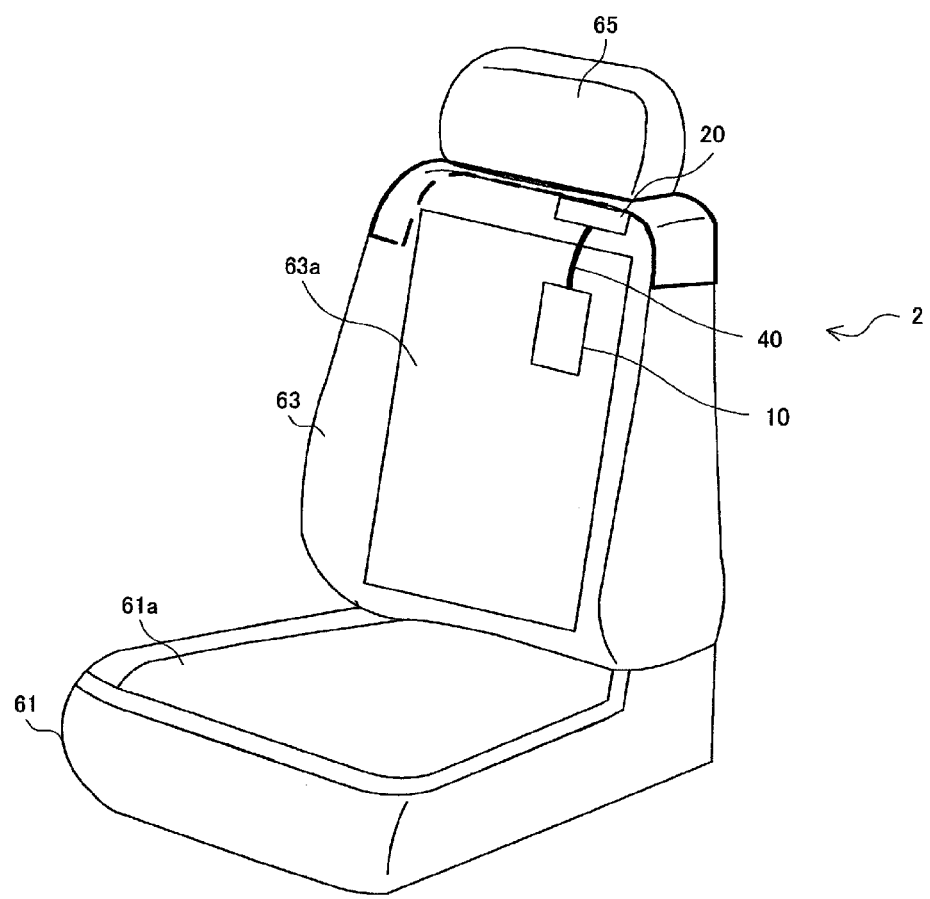
FIG. 4 is a schematic diagram showing the on-vehicle device according to the embodiment of the present disclosure that is arranged in a seat.

The on-vehicle device 2 and the power feeding module 30 will be described below. FIG. 2 shows a configuration of the power supply module. FIG. 3 shows a configuration of the on-vehicle device according to the embodiment of the present disclosure. FIG. 4 is a schematic diagram showing the on-vehicle device according to the embodiment of the present disclosure that is arranged in a seat.

Referring to FIG. 2, the power feeding module 30 is a device capable of transmitting radio waves for power feeding. The power feeding module 30 includes a power transmission substrate 31 having a flat plate shape, and a power feeding antenna 33 having a flat plate shape. The power transmission substrate 31 is an electronic substrate for mounting the power feeding antenna 33. The power feeding antenna 33 is an antenna capable of transmitting radio waves for power feeding and is arranged on a front face portion 31a of the power transmission substrate 31.

Referring to FIG. 1, the power feeding module 30 is attached to the ceiling 53. Specifically, the power feeding module 30 is attached such that a back face portion 31b of the power transmission substrate 31 faces the ceiling 53. Accordingly, the power feeding antenna 33 arranged on the front face portion 31a of the power transmission substrate 31 is arranged so as to face the vehicle interior space 59.

The power feeding module 30 is connected to the battery 58 via a battery cable 58a and receives the supply of electric power for power feeding from the battery 58. The power feeding antenna 33 transmits the electric power for power supply received from the battery 58 to the vehicle interior space 59 by means of radio waves for power feeding, such as microwaves. As mentioned above, the power feeding antenna 33 is arranged on the ceiling 53 so as to face the vehicle interior space 59. Accordingly, the radio waves for power feeding transmitted from the power feeding antenna 33 are unlikely to be blocked by structures in the vehicle interior space 59, and can be transmitted to any position in the vehicle interior space 59. For example, the backrest portion 63 of each seat 60 is arranged so as to rise in a direction substantially orthogonal to the ceiling 53 in the vehicle interior space 59. Therefore, transmission of the radio waves for power feeding from the ceiling 53 is unlikely to be blocked by the backrest portion 63.

Referring to FIG. 3, the on-vehicle device 2 is a device that can be operated by a supply of electric power from the power feeding module 30. The on-vehicle device 2 includes a sensor 10 having a flat plate shape, a power supply module 20 having a flat plate shape, and a flexible line member 40 that connects the sensor 10 to the power supply module 20. The sensor 10 detects the physical condition of the user in the vehicle 50, such as the heartbeat and the body temperature of the user.

The power supply module 20 of the on-vehicle device 2 is a device that receives the radio waves for power feeding from the power feeding module 30 and converts the received radio waves to electric power. The power supply module 20 includes a power receiving substrate 21 having a flat plate shape, a power receiving antenna 23 having a flat plate shape that is to be arranged at a position at which the radio waves for power feeding can be received, and a power supply circuit 25 having a flat plate shape. The power receiving antenna 23 is an antenna capable of receiving the radio waves for power feeding and is arranged on a front face portion 21a of the power receiving substrate 21. The power supply circuit 25 is a circuit that converts the radio waves for power feeding into electric power and is arranged on a back face portion 21b of the power receiving substrate 21.

The power receiving antenna 23 receives the radio waves for power feeding transmitted from the power feeding antenna 33 and outputs the received radio waves to the power supply circuit 25. The power supply circuit 25 has a capacitor or the like, and rectifies the radio waves for power feeding and converts the rectified radio waves into electric power. The power supply circuit 25 outputs the rectified power to the sensor 10 via the line member 40. The power supply circuit 25 may constantly output electric power to the sensor 10, or may intermittently output electric power.

Referring to FIG. 4, the sensor 10 of the on-vehicle device 2 is embedded in the backrest portion 63 near the backrest surface portion 63a.

In the present embodiment, the sensor 10 is arranged so that the surface of the flat plate-shaped sensor 10 is aligned with the backrest surface portion 63a. Thus, the back of the user sitting in the seat 60 comes close to the sensor 10 arranged near the backrest surface portion 63a. The sensor 10 is driven by a supply of electric power from the power supply circuit 25 via the line member 40, and detects the heartbeat, the body temperature, or the like from the back of the user. Note that the sensor 10 can also intermittently receive a voltage at predetermined intervals from the power supply circuit 25 and detect the heartbeat, the body temperature, or the like of the user at predetermined intervals.

The sensor 10 transmits the results of measuring the heartbeat, the body temperature, or the like of the user acquired by the sensor 10 to various devices other than the power feeding module 30. For example, the sensor 10 has a communication module for transmitting the measurement results by means of wireless communication, such as Bluetooth (registered trademark) or the like, to a receiver 71 provided in the instrument panel module 70, a mobile terminal brought into the vehicle 50, or the like.

The backrest surface portion 63a corresponds to the cover of the seat 60 of the present disclosure. In the present embodiment, the sensor 10 is arranged near the back side of the backrest surface portion 63a within the backrest portion 63, and is arranged near the back side of the cover of the seat 60 of the present disclosure.

Referring to FIGS. 1, 3, and 4, the power supply module 20 of the on-vehicle device 2 is embedded in the backrest portion 63 along the backrest top face portion 63b such that the front face portion 21a, on which the power receiving antenna 23 is provided, faces the ceiling 53. That is, the power receiving antenna 23 having a flat plate shape has a surface that receives the radio waves for power feeding, and this receiving surface faces the ceiling 53. The power feeding antenna 33 of the power feeding module 30 transmits the radio waves for power feeding from the ceiling 53 to the vehicle interior space 59. Therefore, the power receiving antenna 23 that faces the ceiling 53 can efficiently receive the radio waves for power feeding from the power feeding antenna 33.

The backrest top face portion 63b corresponds to the cover of the seat 60 of the present disclosure. In the present embodiment, the power receiving antenna 23 is arranged near the back side of the backrest top face portion 63b within the backrest portion 63, and is arranged near the back side of the cover of the seat 60 of the present disclosure.

The line member 40 of the on-vehicle device 2 electrically connects the sensor 10 to the power supply module 20. The line member 40 outputs electric power from the power supply circuit 25 of the power supply module 20 to the sensor 10. The line member 40 is, for example, an FPC. Note that the line member 40 may alternatively be a coaxial cable.

The line member 40 connects the sensor 10 to the power supply module 20 in accordance with the position at which the sensor 10 is arranged and the position at which the power supply module 20 is arranged. In the present embodiment, referring to FIGS. 1 and 4, the line member 40 electrically connects the power supply module 20, which is embedded in the backrest portion 63 along the backrest top face portion 63b, to the sensor 10, which is embedded in the backrest portion 63 along the backrest surface portion 63a. In the case of FIGS. 1 and 4, the line member 40 is embedded in the backrest portion 63 along the backrest surface portion 63a so as to connect an end portion of the power supply module 20 to an end portion of the sensor 10.

As mentioned above, the sensor 10, the power supply module 20, and the line member 40 are embedded within the backrest portion 63. It is thus possible to reduce the discomfort of the user who sits in the seat 60 and touches the backrest portion 63.

According to the above configuration, the sensor 10 is provided in the backrest surface portion 63a of the seat 60 to facilitate measurement of the body temperature or the like of the user. Meanwhile, the power supply module 20 is provided in the backrest top face portion 63b such that the power supply module 20 can easily receive the radio waves for power feeding from the power feeding module 30 provided in the ceiling 53. That is, the power receiving antenna 23 arranged in the backrest top face portion 63b has a higher reception sensitivity for the radio waves for power feeding than in the case where the power receiving antenna 23 is arranged in the backrest surface portion 63a in which the sensor 10 is arranged.

Further, the sensor 10 is connected to the power supply module 20 via the line member 40, and the sensor 10 can receive the supply of electric power from the power supply module 20 via the line member 40. Thus, the sensor 10 and the power supply module 20 are electrically connected via the line member 40 but are separate bodies. This can increase the flexibility of arrangement of the sensor 10 in the vehicle 50. Higher flexibility of arrangement of the sensor 10 enables the sensor 10 to be arranged at positions appropriate for users with different physiques, for example.

In addition, the power supply module 20 can also be arranged more flexibly at a position at which electric power can easily be received by means of the radio waves for power feeding, for example.

As described above, the flexibility of relative arrangement of the power supply module and the electrical component can be improved. Accordingly, the power supply module 20 having the power receiving antenna 23 can be arranged at a position at which the power supply module 20 can easily receive the radio waves for power feeding, and the sensor 10 can be arranged at a position at which the sensor 10 can have higher sensitivity, e.g., at a position close to the user.

Variations

The above-described on-vehicle device 2 has a sensor 10 serving as an electrical component that detects the heartbeat and the body temperature of the user who is in the vehicle 50. However, the on-vehicle device 2 may also include electrical components such as a car navigation system, a television, and a sensor for detecting atmospheric conditions such as odor, temperature, and humidity in the vehicle 50.

In the above, the above sensor 10 and power supply module 20 are arranged in the backrest portion 63 of the seat 60. The positions at which the sensor 10 and the power supply module 20 are arranged are not limited to being in the backrest portion 63 of the seat 60, and may alternatively be in the seat portion 61 or the headrest 65. Furthermore, the positions at which the sensor 10 and the power supply module 20 are arranged are not limited to being in the seat 60, and may alternatively be any positions in the vehicle interior space 59. For example, the sensor 10 and the power supply module 20 may be provided in the instrument panel module 70, a door, a steering wheel, or the like.

In the above, the sensor 10 and the power supply module 20 are embedded within the seat 60. However, the sensor 10 and the power supply module 20 may be arranged so as to be exposed to the surface of, for example, the seat surface portion 61a or the backrest surface portion 63a of the seat 60. The seat surface portion 61a and the backrest surface portion 63a each correspond to the cover of the seat 60 of the present disclosure. Accordingly, the sensor 10 may be arranged on the front side of the cover of the seat 60 of the present disclosure.

In the above, the flat surfaces of the sensor 10 having a flat plate shape and the power supply module 20 having a flat plate shape are arranged along the surface of the seat 60, i.e., the backrest surface portion 63a and the backrest top face portion 63b. However, for example, the sensor 10 and the power supply module 20 may be arranged so that the flat surfaces intersect the seat 60, i.e., the backrest surface portion 63a and the backrest top face portion 63b.

In the above, the sensor 10 and the power supply module 20 are members having a flat plate shape. However, the shapes of the sensor 10 and the power supply module 20 are not limited to flat plate shapes, and may alternatively be box shapes.

In the above, the power supply module 20 having a flat plate shape has the power receiving antenna 23 arranged on the front face portion 21a that faces the ceiling 53, and the power supply circuit 25 arranged on the back face portion 21b that is an opposite face to the front face portion 21a. That is, the power receiving antenna 23 and the power supply circuit 25 are arranged on different faces. However, the power receiving antenna 23 and the power supply circuit 25 may alternatively be arranged on the same face.

In the above, the power feeding module 30 is provided in the ceiling 53. However, the power feeding module 30 may be provided at any position in the vehicle interior space 59, e.g., in the instrument panel module 70, a door, a steering wheel, or the like.

In the above description, the sensor 10 has a communication module for wirelessly transmitting the measurement results. However, the on-vehicle device 2 may alternatively be configured such that the communication module is separately provided from the sensor 10, and a flexible line member that electrically connects the sensor 10 to the communication module is additionally provided. This line member may be integrated with or separate from the line member 40. In this case, it is favorable that the communication module is arranged at a position at which a certain level of quality of communication with the destination to which the measurement results are transmitted can be ensured, e.g., at the same position as the power supply module 20.

By the way, various members, including various electrical components such as the sensor 10, can be mounted in the vehicle 50. It is desirable that the flexibility of arrangement of various members can be improved in the vehicle 50.

In this regard, the on-vehicle device 2 according to the embodiment of the present disclosure is an on-vehicle device 2 to be mounted in a vehicle 50 and includes: an electrical component including a sensor 10; a power supply module 20 including a power receiving antenna 23 and a power supply circuit 25 that converts radio waves for power feeding received by the power receiving antenna 23 into electric power and supplies the electric power to the electrical component; and a flexible line member 40 that electrically connects the electrical component to the power supply module 20.

For example, the vehicle 50 can be equipped with an electrical component, such as a sensor for detecting odor in the vehicle 50, the sensor 10 for detecting the heartbeat and the body temperature of a user in the vehicle, a car navigation, and a television. Electric power is needed to drive such an electrical component. The above-described power supply module 20 receives radio waves for power feeding with the power receiving antenna 23, and converts the radio waves for power feeding received by the power receiving antenna 23 into electric power with the power supply circuit 25. The power supply module 20 then outputs the electric power to the electrical component via the line member 40.

The electrical component and the power supply module 20 are electrically connected via the line member 40 but are separate bodies. This can improve the flexibility of arrangement of the electrical component in the vehicle 50.

In addition, the power supply module 20 can also be arranged more flexibly at, for example, a position at which the power supply module 20 can easily receive the radio waves for power feeding. This can improve the flexibility of arrangement of the electrical component while allowing the power receiving antenna 23 to be arranged at a position at which the power receiving antenna 23 can receive the radio waves for power feeding.

Furthermore, the configuration using the flexible line member 40 can further improve the flexibility of relative arrangement of the power supply module 20 and the electrical component.

According to the above configuration, the flexibility of arrangement of various members can be improved in the vehicle 50.

The foregoing embodiments are to be construed in all respects as illustrative and not restrictive. The scope of the present disclosure is defined by the claims rather than the description above, and is intended to include all modifications within the meaning and scope of the claims and equivalents thereof.

The above description includes characteristics described in the following supplementary note.

Supplementary Note 1

An on-vehicle device to be mounted in a vehicle, the device comprising: an electrical component including a sensor; a power supply module including a power receiving antenna to be arranged at a position at which radio waves for power feeding are receivable, and a power supply circuit configured to convert the radio waves for power feeding received by the power receiving antenna into electric power and supply the electric power to the electrical component; and a line member having flexibility and electrically connecting the electrical component to the power supply module, wherein the power receiving antenna has a reception sensitivity for the radio waves for power feeding that is higher than a reception sensitivity in a case where the power receiving antenna is arranged at a location at which the sensor is arranged.

The invention claimed is:

1. An on-vehicle device to be mounted in a vehicle, the device comprising:
   an electrical component including a sensor;
   a power supply module including a power receiving antenna configured to receive radio waves for power feeding transmitted from a power feeding antenna provided in a ceiling of the vehicle, and a power supply circuit configured to convert the radio waves for power feeding received by the power receiving antenna into electric power and supply the electric power to the electrical component;
   a communication module configured to transmit a result of measurement performed by the sensor, by means of wireless communication;
   a first line member having flexibility and electrically connecting the electrical component to the power supply module; and
   a second line member having flexibility and electrically connecting the sensor to the communication module,
   wherein the power supply module and the communication module are to be provided in a part of a backrest portion of a seat mounted in the vehicle, the part facing the ceiling of the vehicle.

2. The on-vehicle device according to claim 1, wherein the electrical component detects, using the sensor, an indicator including at least either a physical condition of a user or an atmospheric condition in the vehicle, and
   the sensor is to be provided in a cover of the seat mounted in the vehicle.

3. The on-vehicle device according to claim 2, wherein the electrical component detects the physical condition of the user using the sensor, and
   the sensor is to be provided in a part, in the backrest portion, that comes into contact with a back of the user.

4. The on-vehicle device according to claim 3, wherein the first line member is a flexible printed circuit (FPC).

5. The on-vehicle device according to claim 3, wherein the power receiving antenna receives the radio waves for power feeding that are based on electric power supplied from the vehicle.

6. The on-vehicle device according to claim 2, wherein the first line member is a flexible printed circuit (FPC).

7. The on-vehicle device according to claim 2, wherein the power receiving antenna receives the radio waves for power feeding that are based on electric power supplied from the vehicle.

8. The on-vehicle device according to claim 1, wherein the first line member is a flexible printed circuit (FPC).

9. The on-vehicle device according to claim 8, wherein the power receiving antenna receives the radio waves for power feeding that are based on electric power supplied from the vehicle.

10. The on-vehicle device according to claim 1, wherein the power receiving antenna receives the radio waves for power feeding that are based on electric power supplied from the vehicle.

11. An on-vehicle system to be mounted in a vehicle, the system comprising:

an on-vehicle device; and a power feeding antenna to be provided in a ceiling of the vehicle and configured to transmit radio waves for power feeding from the ceiling to an interior space of the vehicle, the on-vehicle device including:

an electrical component having a sensor;

a power supply module having a power receiving antenna and a power supply circuit configured to convert the radio waves for power feeding received by the power receiving antenna into electric power and supply the electric power to the electrical component;

a communication module configured to transmit a result of measurement performed by the sensor, by means of wireless communication;

a first line member having flexibility and electrically connecting the electrical component to the power supply module; and a second line member having flexibility and electrically connecting the sensor to the communication module, wherein the power supply module and the communication module are to be provided in a part of a backrest portion of a seat mounted in the vehicle, the part facing the ceiling of the vehicle.

12. The on-vehicle system according to claim 11, wherein the power feeding antenna transmits, to the power receiving antenna, the radio waves for power feeding that are based on electric power supplied from the vehicle.

* * * * *